Nov. 9, 1965  E. G. HOLMBERG  3,216,697
BIASED PLUG VALVE
Filed Jan. 31, 1962
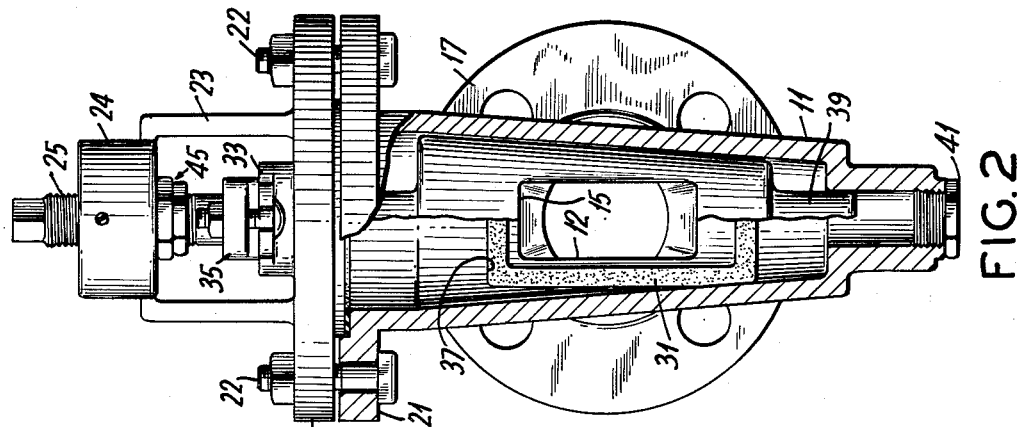
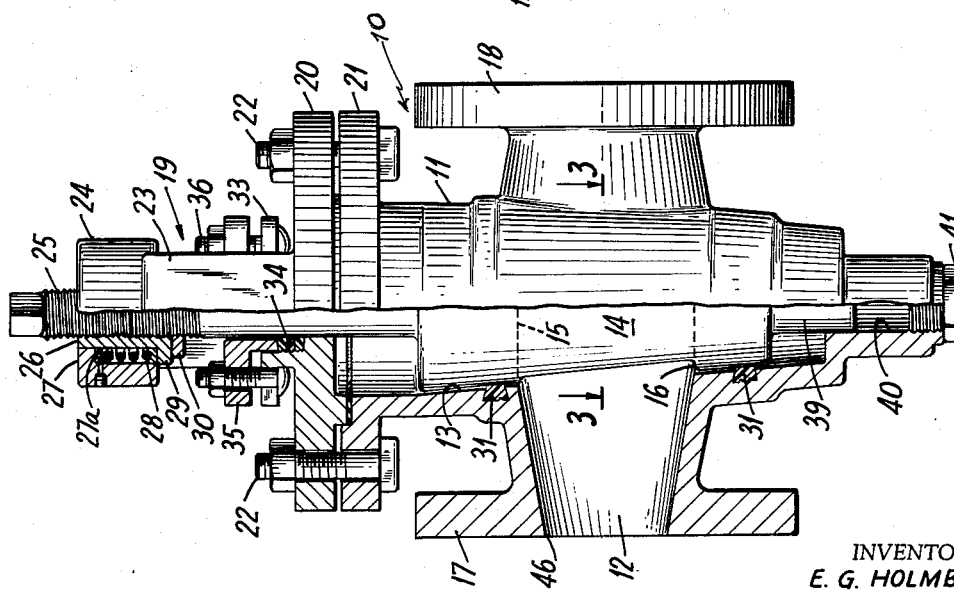
INVENTOR.
E. G. HOLMBERG
BY
ATTORNEY.

ns`United States Patent Office`

3,216,697
Patented Nov. 9, 1965

3,216,697
BIASED PLUG VALVE
Emil G. Holmberg, 298 Mountain Ave.,
Berkeley Heights, N.J.
Filed Jan. 31, 1962, Ser. No. 170,019
1 Claim. (Cl. 251—184)

This invention relates generally to plug valves of the type comprising a valve body with a bore running therethrough transverse to the flow passage therein and having a plug cooperably associated with said bore in substantially tight-fitting and conforming relationship with the surface of the bore. In particular, the invention relates to improvements in plug valve seats.

It is known to use plug valves to control the flow of corrosive and non-corrosive fluids and the like, particularly valves of the type comprising a frusto-conical bore having contained therein a conforming frusto-conical plug having a port therethrough adapted for alignment with the flow passage of the valve body. Such valves have certain advantages over gate or globe valves for control of the flow of fluids, particularly corrosive fluids and solvents. For example, in the gate valve, the surface of the gate as well as the surface of the seat which forms the seal are exposed to the flow the entire time the valve is open. Under such conditions, the surfaces are subjected to continuing wear, abrasion and corrosive action of the fluid. In addition, the gate valve tends to be a depository of solids, crystals, heavy gums or adhesives depending upon the nature of the fluid. Similar inherent disadvantages prevail in the globe valve in which an abrupt change in direction of flow occurs whereby the flow resistance is increased over the straight-through flow which is characteristic of the plug valve.

In contradistinction to the foregoing types of valves, only a portion of the seal-forming surface of the plug in the plug valve body is exposed in the closed position and when in the full open position, practically the entire seal-forming surface is enclosed and protected against the flow. In order to prevent leakage, it is essential that the plug be made to fit accurately in the bore of the valve body so that a tight fit is assured in either the closed or open position. This is particularly important where the fluid being handled is corrosive. However, because a close fit is necessary, there is generally a tendency of the contacting metal parts to bind or gall, particularly where highly corrosion resistant alloys are employed as the construction material for the valve.

Attempts have been made to lubricate the entire plug with the aim of minimizing galling and of facilitating the opening and closing of the valve. While this was helpful to some extent, certain disadvantages were apparent in that the fluid passing through the valve was either contaminated, or that the nature of the fluid was such as to remove the lubricant, thereby making it difficult to open and close the valve.

In overcoming the foregoing objections, a molded plastic liner was proposed for insertion into the bore between the bore and the tapered plug, the plastic liner conforming substantially to the surface of the bore and that of the plug. By employing a plastic liner having corrosion resistant and self-lubricating properties, a relatively tight seal was obtained while at the same time enabling the valve to be manipulated. Because the liner was designed to cover substantially the whole surface of the bore, except for openings in the liner conforming to the passageway of the valve, means had to be provided to keep the liner properly oriented in the bore and to prevent it from turning with the plug. In addition, pressure had to be maintained against the liner by the downward or upward pressure of the plug, depending upon the direction of the taper, so as to keep it tightly sealed against the contacting surfaces. This had the disadvantage of causing the liner to move and creep within the bore even to the extent of setting up resistance to flow in the passageway. To insure a stationary liner generally required redesigning certain portions of the valve body so as to facilitate the use of a combination of anchoring means for the liner.

I have now discovered a simple but effective means for maintaining a seal between the plug and the valve bore without resorting to the use of a liner, and without resorting to the use of complicated anchor means combinations for maintaining the seat in place.

It is an object of my invention to provide a plug valve having a seal or seat formed of a deformable, low-friction, non-galling material strategically placed within the bore about the opening of the flow passage whereby the surface of the bore is substantially protected against the constant action of corrosive fluids.

Another object is to provide a seat of simple configuration capable of being used with plug valves without the need of redesigning such valves to any great extent.

Other objects and advantages will be clearly apparent from the following description when taken in conjunction with the appended claims and the accompanying drawings, wherein:

FIG. 1 is a vertical view of a plug valve with the valve body partially broken away to show the various elements hidden from view;

FIG. 2 is an end elevation view of FIG. 1 partially sectioned transverse to the flow passage of the valve body;

FIG. 3 is a section taken along line 3—3 of FIG. 1 looking toward the lower portion of the valve body showing the cooperable relation of the resilient seat to the surface of the tapered plug;

FIG. 4 depicts a valve yoke portion broken away showing in partial cross section the relation of the yoke bushing to the valve plug stem; and FIG. 5 is illustrative of a sectional view of the bottom portion of the valve body showing one embodiment of a removable plug guide.

In accordance with my invention, I provide a novel seat combination for plug valves which is associated with the surface of the bore about the opening of the flow passage as it enters the bore and a corresponding one which is associated with the surface of the bore about the opening of the flow passage as it leaves said bore. My invention is particularly applicable to plug valves having a tapered bore and plug. In one embodiment of my invention, the improved seat combination comprises a first annular groove within the valve body surrounding the opening of the flow passage as it enters the bore and a second annular groove surrounding the opening of the flow passage as it leaves the bore. Each groove has press fitted within it an annular seat of deformable material such as plastic or soft metal having anti-friction and substantially corrosion-resistant properties, said seats projecting out of said grooves in an amount sufficient to insure sealing contact with the tapered plug. In a preferred embodiment, means are associated with the valve for maintaining a predetermined axial pressure on the plug towards the small end thereof to maintain the tapered plug in sealing engagement with the annular seats while allowing for ready turning of the plug for opening and closing the flow passage.

Referring now to the drawings, wherein like reference numerals are used throughout to designate like parts, the plug valve is shown in FIG. 1 designated generally by reference numeral 10 illustrating the improved seat combination in accordance with my invention.

In FIG. 1, a plug valve is shown comprising a valve body or casing 11 having a through passage 12 for flow of fluid and a tapered bore 13 running transversely thereto having cooperably associated therewith a tapered valve plug 14 which has a port 15 (note also FIG. 3) running therethrough adapted for alignment with the flow passage as it enters the bore at 16. The edge of the port is provided with a radius or bevel 15a, e.g., 1/32 to 1/8 inch, to insure free movement within the bore. The edge at the bore opening is likewise radiused or bevelled.

The valve body is end flanged at 17 and 18 to enable connecting the valve to corresponding flanges in a pipe line system. Of course, it will be appreciated that the valve need not be edge flanged but may comprise threaded ends connectable to corresponding threaded portions on the pipe line. In the embodiment shown, the valve body has a bonnet designated generally as 19 comprising a flange 20 connected around its periphery to flange 21 by bolts 22. Of course, in place of flanges, threaded connections may be used. The valve bonnet also has a valve yoke 23 integral with bonnet flange 20 and has an upper annular shroud portion 24 completely surrounding valve plug stem 25. As shown, the upper portion of valve stem 25 is threaded and is in threaded engagement with bushing 26 which is in sliding contact with the inner surface of annular shroud 24 at shoulder 27 which is provided with a flat roller or ball bearing 27a. Between the bushing and the shroud, an annular space is provided for retaining yoke bushing spring 28 which is held in place by the outwardly flanged portion 29 of the bushing. A lock nut 30 is provided on the stem for setting the compression of the spring after the tapered plug valve has been positioned within the tapered bore. The compression of the spring is such as to bias the valve plug in the downwardly direction in sealing contact with seats 31 and 32 to be described later (note FIGS. 1, 2, 3 and 5).

Bonnet flange 20 has extending axially thereof near the valve stem an annular flange 33 offset from the valve stem to provide an annular space about the stem adapted to confine packing gland material 34 which is held against the smooth surface portion of the stem by means of annular packing gland follower 35 which is connected to annular flange 33 by bolts 36.

Within the valve body on the surface of the bore about the opening of the fluid passageway, I provide annular grooves 37 and 38 (note FIGS. 1, 2, 3 and 5) for receiving, for example, a rectangularly shaped seat of deformable material (note seat 31 of FIG. 2). The annular grooves are preferably produced by casting, although they may be machined in the bore. Depending on the size of the valve, the grooves may vary in width from about 1/4 inch to as high as about 1 inch or higher. I prefer to cast the grooves into the surface of the bore as the inner portions of the grooves provide a roughened as-cast surface which helps in gripping and holding the deformable seat in place when the seat is pressed into the grooves. The annular seat is made to virtually the same dimensions as the groove and the ability of some materials to cold flow under pressure and retain their deformed shape when the pressure is released is taken advantage of to seal and lock the seat in place within the groove. When a dove-tail or some other groove configuration is used for holding the seat in place, resilient or elastomeric materials such as synthetic or natural rubber made to the same configuration as the groove can also be used. The groove may have right angled corners or have a slight undercut as shown in FIG. 1 to aid further in retaining the seat in position. The thickness of the seat should be such that it projects from the bore surface, for example project about one-thirty second of an inch from the surface.

As will be noted, instead of having substantially the whole surface of the frusto-conical bore covered with a deformable liner, only a small portion need be sealed. This is particularly important in the case of large plug valves where the flow passage is of the order of two inches or more in width or in diameter. Conically shaped plastic liners used in such large valves would necessarily be subjected to so much pressure that the corresponding increase in friction over the large bore area would tend to cause the liner to twist or move with the turning of the plug. On the other hand, my novel combination requires only a small bearing area between the seat, the bore surface and the plug surface and thus high pressure is not required on the plug to maintain a fluid-tight seal. Other than the groove for receiving the seat, additional anchoring means are not required to maintain the seat in fixed position. The groove will fully retain the seat. To this extent, my novel combination is simple in construction and does not require modifying substantially the internal design of the valve body. All that is required is a cast-in annular groove which can be easily provided for on the foundry pattern.

After the valve body has been cast with the annular grooves in the face of the bore, the tapered bore is finish machined and polished in the usual manner to conform substantially to the machined and polished surface of the tapered plug. Since my invention does not require redesigning the valve, it is apparent that it is applicable to plug valves generally.

Where the plug valve is used for handling corrosive liquids, I prefer a deformable seat material having corrosion resistance and either self-lubricating or non-galling properties. I prefer to use a deformable plastic or soft metal material that retains its deformed shape after the application of pressure or force. Highly suitable plastic compositions are polyethylene resins, particularly halogen substitutions thereof. Examples of such plastic compositions are polyethylene itself, $C_2Cl_4$, $C_2ClF_3$ and $C_2F_4$. The latter product, which goes by the chemical name of polytetrafluoroethylene, is preferred, particularly interpolymers and copolymers available in the trade under the trademark "Teflon." This latter material is substantially inert in the presence of corrosive fluids, has self-lubricating properties, substantially low frictional drag in contact with the corrosion resistant metals, toughness and resistance to physical wear and abrasion over a wide temperature range and capable of being sufficiently deformed under pressure to insure effective sealing conditions.

Soft metal materials that would be suitable for seats in my invention are lead and various soft babbitt compositions. After seats of these materials are placed in the groove area, they can be forced in place by placing a tapered plug in the bore and applying force by means of an air hammer or other suitable means of applying pressure on the plug stem.

Depending upon the material being used, the seat surface can be used in the as-pressed condition of if found desirable can be machined to provide the desired conformation with the plug after the seat is pressed in place.

The annular seat may be formed by any suitable means. It may be cut from a flat sheet of material or die stamped therefrom.

By arranging the seats as shown in FIGS. 2 and 3, I insure complete sealing about the passage opening so that when the valve is opened as shown in FIG. 3, the fluid flows only through passageway 12 and through plug port 15 without going around the surface of the plug. Likewise, when the valve is closed, the seats prevent the fluid from flowing around the face of the valve plug. Because of the small area of contact between the seats and the valve plug, the plug is easily turned to the open and closed position.

As stated hereinbefore, by maintaining axial pressure on the valve stem, a tight seal is easily attainable. In FIG. 1, this is attained by means of biasing spring 28. The valve plug is movable in the vertical direction and the amount it moves will depend upon the degree of wear on the seating surfaces. In the embodiment shown in FIG. 1, the plug is provided with a polished reduced end portion 39 or guide arranged in sliding contact with the reduced bottom bore 40 of the valve body adapted to keep the valve plug in vertical alignment, the end of the bottom bore being closed by threaded plug 41. Another embodiment of a plug guide is shown in FIG. 5 wherein the end of the valve plug 14 has a polished cylindrical bore 42 adapted to mate with the combined threaded plug 43 and male guide 44. This structure is advantageous in that the metal of male guide 44 may be the same as that of the valve plug, when it becomes desirable to use a valve plug of a more corrosion resistant material than the body.

While a bottom plug guide is not essential to the proper operation of the valve, it is desirable to assure even distribution of wear on the seating surfaces.

FIG. 4 shows another form of the bonnet yoke in which the biasing spring is omitted. Should seat wear occur during use, take-up can be effected manually by re-setting the bonnet yoke nut 30. The bushing and lock nut assembly 45 is shown in FIG. 2.

While the seat shown in FIG. 2 is rectangular in shape, it is not necessarily limited thereto. It may be elliptical, circular or correspond generally to the shape of the passage opening entering the valve bore. In the case of the valve illustrated in FIGS. 1 and 2, the passage may start as a circular opening at 46 of flange 17 and merge into rectangular opening 12 at the bore surface as shown in FIG. 2.

I prefer that the peripheral end of the seat extend further below the bottom rectangular opening 12 than it extends above it. This is desirable as it assures complete sealing contact with the valve plug surface at various vertical displacements of the plug. For example, as the seats gradually wear down, the tapered plug will move slightly downward into the small tapered end of the valve bore to maintain a fluid-tight seal. A tight seal will be maintained at all times even when the seats have completely worn down. When in the closed position, should the seats be destroyed by either wear or exposure to excessive temperatures, complete shut-off will be maintained by metal to metal contact of the plug and inner body bore. This will be automatically accomplished in the design which contains the embodiment calling for the use of a spring to maintain a predetermined axial pressure on the plug. This will become evident as the valve plug tightens up or binds on turning on metal to metal contact, in which case the pipe line is closed, the plug removed, and the old seats replaced with a new set of seats.

Although the valve bore and plug are shown tapered in the downwardly direction, my invention is not necessarily limited to such designs. For example, the bore may have a reverse taper and contain a valve plug correspondingly tapered. One such valve is illustrated in U.S. Patent 2,713,987. In such a valve a removable closure plate or cap is provided at the bottom for removing and inserting the valve plug, said cap having a take-up set screw with a disc at one end adapted for applying axial pressure against the bottom of the valve plug. When the foregoing design is used, it will be appreciated that it would be accompanied with changes in the bonnet design.

The type of metal employed in the construction of the valve will depend upon the use to which the valve is put. Where corrosion resistance is an important criterion, the valve body and plug may be made of nickel cast iron, nickel, nickel-copper alloys, iron-chromium alloys, nickel-chromium-iron alloys and the like. Certain of these metals are hard and difficult to machine and exhibit in some instances bad galling and seizing properties. My invention is particularly adapted to such materials.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claim.

What is claimed is:

A plug valve comprising a valve body having a tapered bore passing longitudinally therethrough and a flow passage opening into and passing transversely through said bore, a tapered valve plug whose surface conforms substantially to the surface of said tapered bore and receivable therein in tight-fitting engagement with said bore and having a port passing transversely therethrough adapted for alignment with said flow passage, said tapered valve plug having a stem extending from its large end, a bonnet surrounding said valve stem and connected to said valve body, an annular chamber associated with said bonnet surrounding said stem containing packing gland material therein, an annular packing gland follower means associated with said annular chamber for applying pressure to said packing gland material, a first separate annular groove within said valve body completely surrounding the opening of the flow passage as it enters said bore, a second separate annular groove completely surrounding the opening of the flow passage as it leaves the bore, a first separate annular seat of substantially flat deformable material having anti-friction and substantially corrosion-resistant properties press fitted into said first groove, a second separate annular seat also formed of said substantially flat deformable material press fitted into said second groove, each of said seats projecting out of said grooves in an amount to insure sealing contact with said tapered plug and biasing means associated with said valve for maintaining a predetermined axial pressure on said plug towards the small end thereof to maintain said tapered plug in sealing engagement with each of the annular seats while allowing for ready turning of said plug via its turning means for opening and closing said flow passage, said means for maintaining said predetermined pressure being cooperably associated with said bonnet and said valve stem.

References Cited by the Examiner
UNITED STATES PATENTS

| | | | |
|---|---|---|---|
| 1,892,835 | 1/33 | Hamer | 251—181 |
| 2,055,232 | 9/36 | Hardy | 251—309 X |
| 2,756,960 | 7/56 | Church | 251—161 |
| 2,816,693 | 12/57 | Greaves | 251—181 X |
| 2,864,579 | 12/58 | Stoltenberg | 251—309 |
| 3,035,811 | 5/62 | Hamer | 251—317 |
| 3,090,594 | 5/63 | Floyd | 251—317 X |
| 3,160,387 | 12/64 | Windsor | 251—317 |

ISADOR WEIL, *Primary Examiner.*